(12) United States Patent
Gildon

(10) Patent No.: US 9,743,735 B2
(45) Date of Patent: Aug. 29, 2017

(54) ILLUMINATED HANDBAG ASSEMBLY

(71) Applicant: George Gildon, Austin, TX (US)

(72) Inventor: George Gildon, Austin, TX (US)

(*) Notice: Subject to any disclaimer, the term of this patent is extended or adjusted under 35 U.S.C. 154(b) by 0 days.

(21) Appl. No.: 14/883,139

(22) Filed: Oct. 14, 2015

(65) Prior Publication Data

US 2017/0105500 A1    Apr. 20, 2017

(51) Int. Cl.
| | |
|---|---|
| *A45C 15/06* | (2006.01) |
| *A45C 3/06* | (2006.01) |
| *A45C 13/28* | (2006.01) |
| *A45C 13/02* | (2006.01) |
| *F21V 33/00* | (2006.01) |
| *F21S 9/03* | (2006.01) |
| *H02J 7/35* | (2006.01) |

(52) U.S. Cl.
CPC .............. *A45C 15/06* (2013.01); *A45C 3/06* (2013.01); *A45C 13/02* (2013.01); *A45C 13/28* (2013.01); *F21S 9/032* (2013.01); *F21V 33/0008* (2013.01); *H02J 7/355* (2013.01)

(58) Field of Classification Search
CPC ... A45C 3/06; A45C 15/06; A45F 3/04; A45F 2200/0508; A45F 5/02; A45F 2003/025; F21S 9/032; F21S 9/037; F21S 9/035; F21V 33/0008; F21V 23/0414; F21W 2121/06; F21L 2001/027; F21L 4/00; F21L 4/027; F21L 4/045; H01L 31/04; H01M 10/465; H02J 7/355; H02S 10/40

See application file for complete search history.

(56) References Cited

U.S. PATENT DOCUMENTS

| | | | | |
|---|---|---|---|---|
| 4,591,835 A | * | 5/1986 | Sharp ................. | G08B 13/1427 340/539.1 |
| 4,912,611 A | * | 3/1990 | Lyle ...................... | A45C 15/06 362/155 |
| 6,447,142 B1 | | 9/2002 | Weir | |
| D499,825 S | | 12/2004 | Wolf | |
| 6,870,089 B1 | * | 3/2005 | Gray ..................... | H01L 31/042 136/200 |
| 8,001,803 B2 | * | 8/2011 | Kanagaki ............... | A45C 15/00 62/457.2 |
| 8,282,235 B2 | | 10/2012 | Gilligan | |
| 8,674,211 B1 | | 3/2014 | Palmer et al. | |
| 9,375,061 B2 | * | 6/2016 | Mosee ................... | A45C 1/02 |
| 2005/0140331 A1 | * | 6/2005 | McQuade ............ | A45C 15/00 320/101 |
| 2005/0219839 A1 | | 10/2005 | Branson | |

(Continued)

FOREIGN PATENT DOCUMENTS

WO    WO2012060805    5/2012

*Primary Examiner* — Hargobind S Sawhney

(57) ABSTRACT

An illuminated handbag assembly includes a personal item carrier including a housing having a bottom wall and a perimeter wall that is attached to and extends upwardly therefrom. The perimeter wall has an upper edge defining an opening extending into an interior of the housing. A handle is attached to the housing and a light emitter is mounted within the interior. A battery is mounted in the housing and is electrically coupled to the light emitter. A cellular phone charger is mounted within the housing and is electrically coupled to the battery for charging a cellular phone placed within the housing and placed in electrical communication with the cellular phone charger.

10 Claims, 5 Drawing Sheets

(56) References Cited

U.S. PATENT DOCUMENTS

| | | | |
|---|---|---|---|
| 2006/0157525 A1* | 7/2006 | Furlong | A45F 3/02 224/601 |
| 2008/0210728 A1* | 9/2008 | Bihn | A45F 3/04 224/576 |
| 2009/0320516 A1* | 12/2009 | Kanagaki | A45C 15/00 62/457.2 |
| 2010/0053941 A1 | 3/2010 | Ibison | |
| 2012/0042996 A1* | 2/2012 | Glynn | A45C 15/00 150/106 |
| 2012/0212940 A1 | 8/2012 | Leuty | |

* cited by examiner

ILLUMINATED HANDBAG ASSEMBLY

BACKGROUND OF THE DISCLOSURE

Field of the Disclosure

The disclosure relates to lighted purse devices and more particularly pertains to a new lighted purse device for assisting a person in locating articles located within their purse or other similar personal storage device.

SUMMARY OF THE DISCLOSURE

An embodiment of the disclosure meets the needs presented above by generally comprising a personal item carrier including a housing having a bottom wall and a perimeter wall that is attached to and extends upwardly therefrom. The perimeter wall has an upper edge defining an opening extending into an interior of the housing. A handle is attached to the housing and a light emitter is mounted within the interior. A battery is mounted in the housing and is electrically coupled to the light emitter. A cellular phone charger is mounted within the housing and is electrically coupled to the battery for charging a cellular phone placed within the housing and placed in electrical communication with the cellular phone charger.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
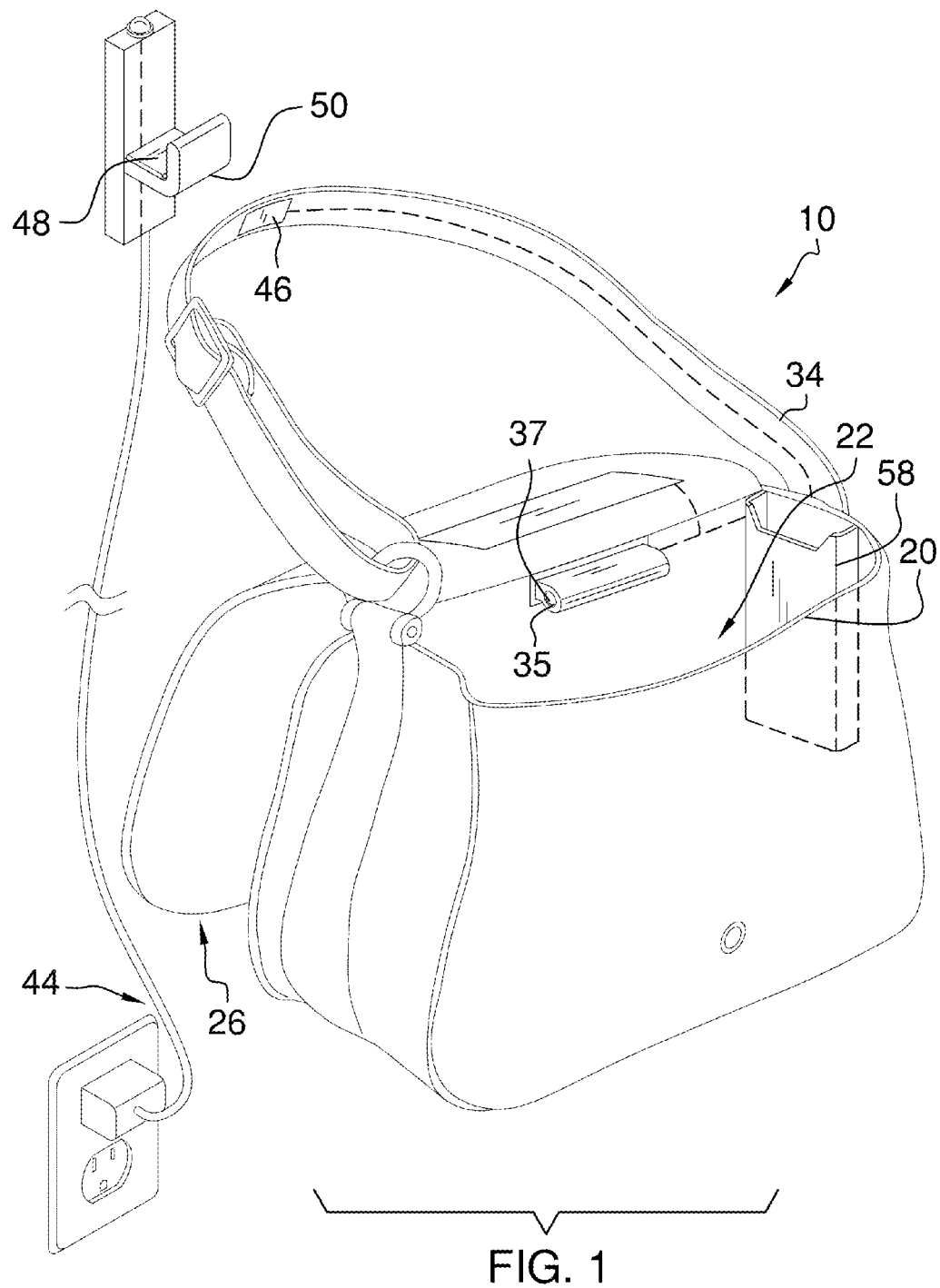
FIG. 1 is a front perspective view of an illuminated handbag assembly according to an embodiment of the disclosure.
Figure 2:
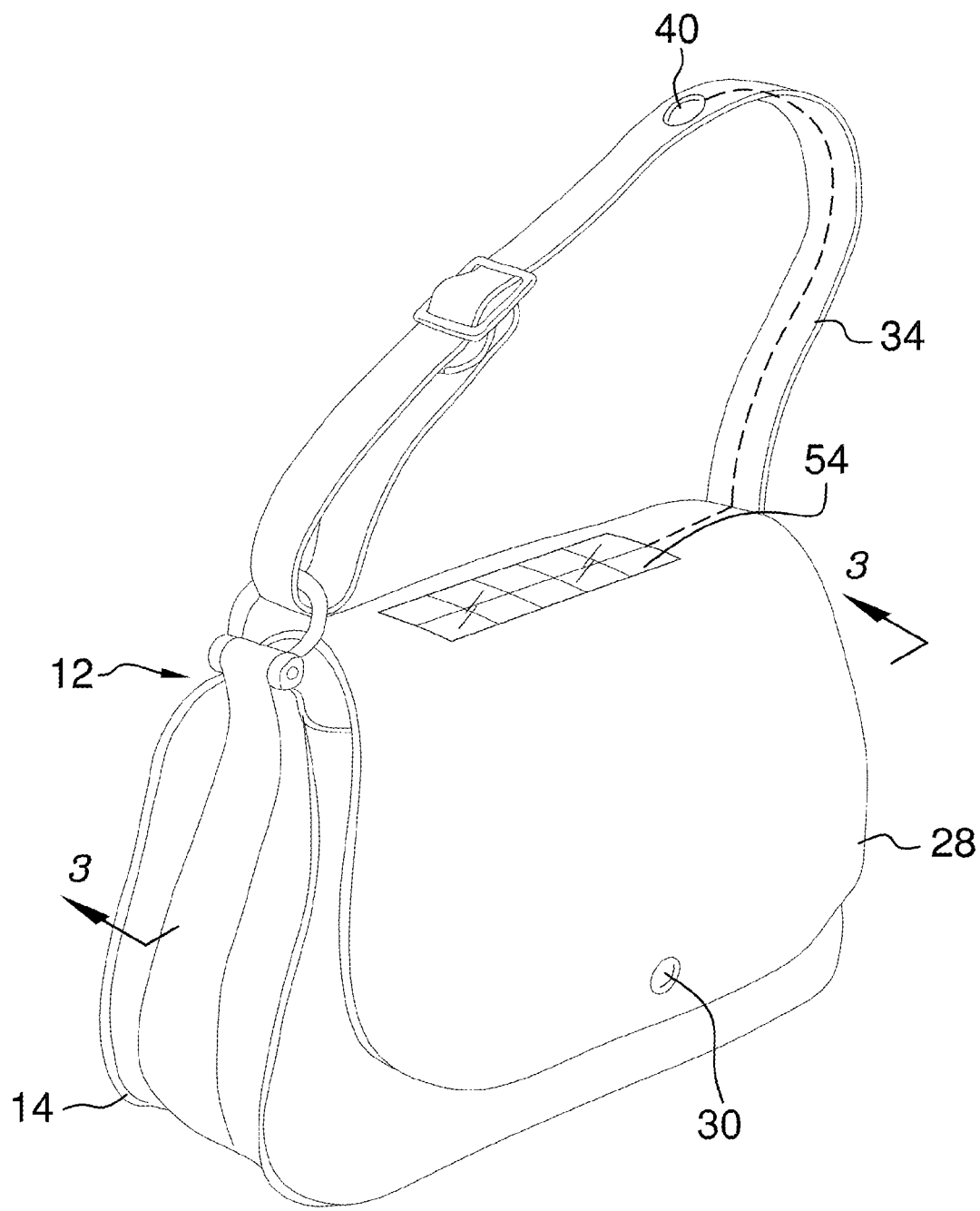
FIG. 2 is a front perspective view of an embodiment of the disclosure.
Figure 3:
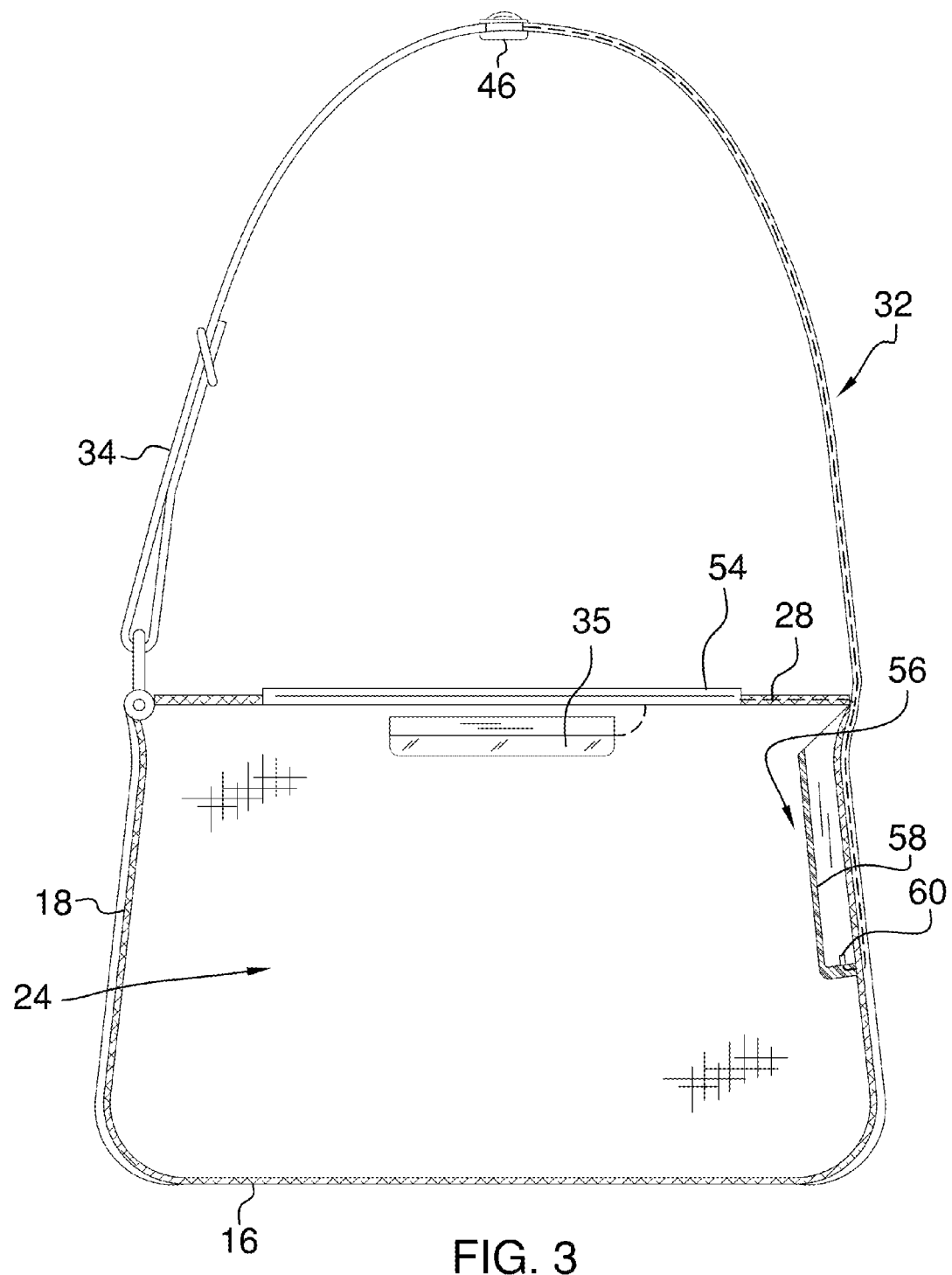
FIG. 3 is a cross-sectional view of an embodiment of the disclosure taken along line 3-3 of FIG. 2.

With reference now to the drawings, and in particular to FIGS. 1 through 5 thereof, a new lighted purse device embodying the principles and concepts of an embodiment of the disclosure and generally designated by the reference numeral 10 will be described.

As best illustrated in FIGS. 1 through 5, the illuminated handbag assembly 10 generally comprises a personal item carrier 12 which may include various satchels, purses, briefcases, backpacks and the like typically used for holding small electronics, personal effects, money, makeup, paperwork or other similar items found in such personal item carries. The personal item carrier 12 includes a housing 14 that has a bottom wall 16 and a perimeter wall 18 which is attached to and extends upwardly therefrom. The perimeter wall 18 has an upper edge 20 defining an opening 22 extending into an interior 24 of the housing 12. The housing 12, particularly if the personal item carrier 12 is a purse, will be comprised of a flexible material. The flexible material may comprise a cloth material, leather material, or synthetic materials conventionally used with purses.

A closure 26 is attached to the housing 14 and is positioned in a closed position closing the opening 22 or in an open position allowing access to the interior 24 through the opening 22. The closure 26 may comprise a snap, zipper or the like conventionally utilized with a purse or a latch as would be used with a briefcase. However, it may be beneficial for the closure 26 to comprise a flap 28 that is attached to the perimeter wall 18 and is removably extendable over the opening 22 and which may be secured in place with a fastener 30. A handle 32 is attached to the housing 14. The handle 32 may comprise an elongated strap 34 that has a pair of ends attached to the housing 14. The strap 34 has a length greater than 12.0 inches and may have an adjustable length.

Figure 4:
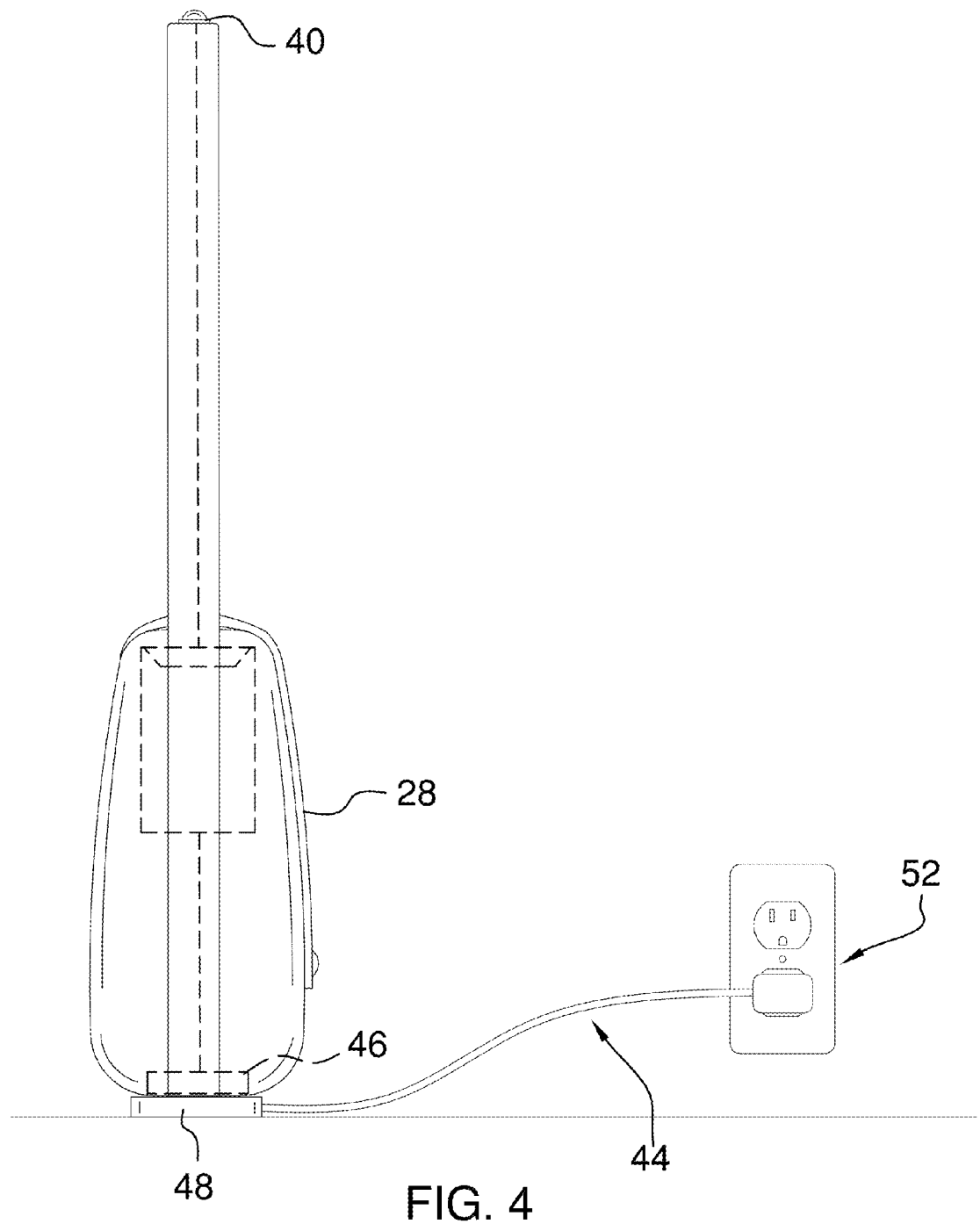
FIG. 4 is a side view of an embodiment of the disclosure.
Figure 5:
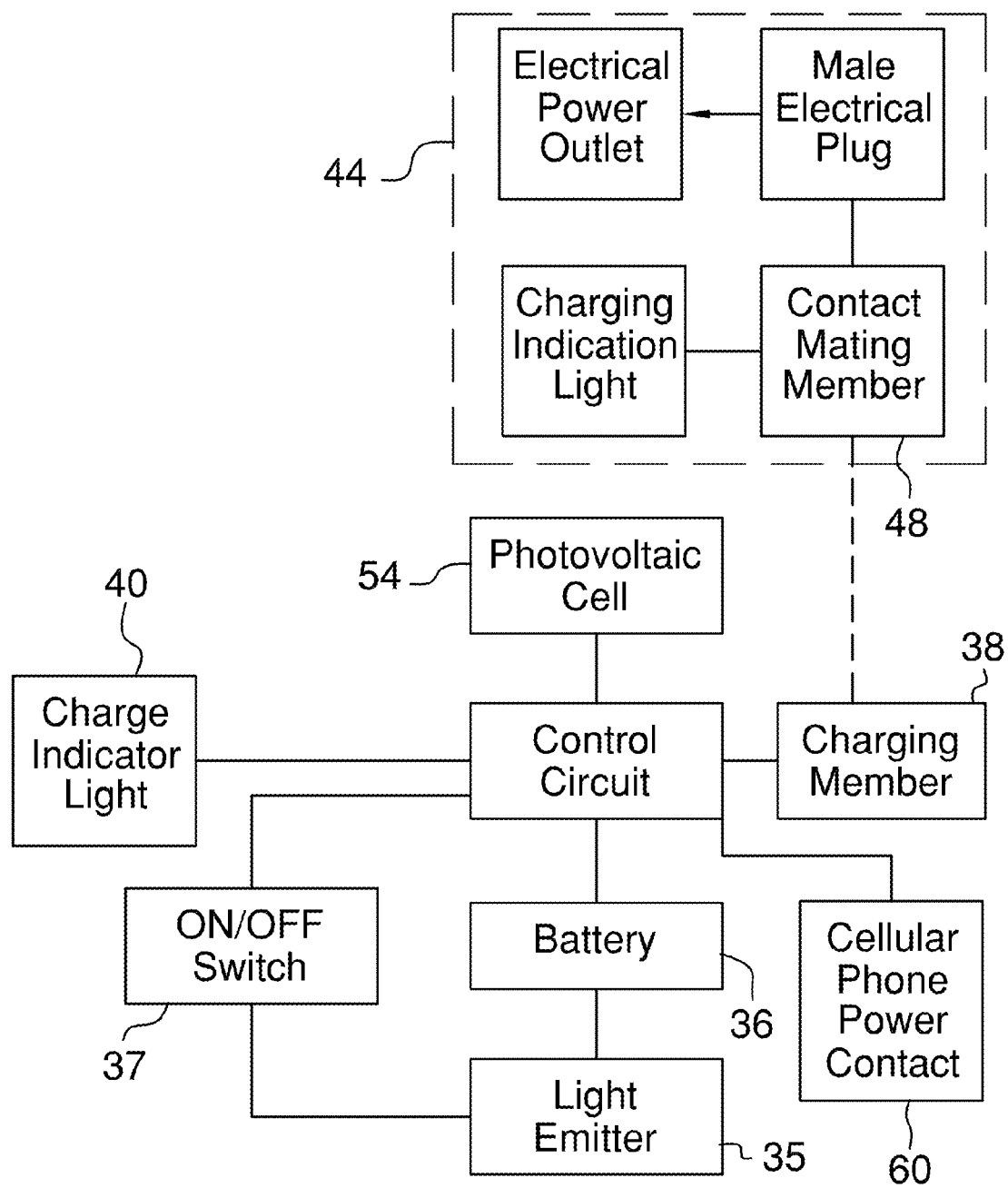
FIG. 5 is a schematic view of an embodiment of the disclosure.

A light emitter 35 is mounted within the interior 24. The light emitter 35 may comprise a light emitting diode. A battery 36 is mounted in the housing 14 and is electrically coupled to the light emitter 35. The battery 36 is a rechargeable battery. The light emitter 35 is powered by the battery 36 and may be turned on or off with an on/off switch electrically coupled to the battery 36. A charging member 38 is mounted to the personal item carrier 12 and is electrically coupled to the battery 36 for recharging the battery as needed. An indicator light 40, electrically coupled to the battery 36, may be mounted on the personal item carrier 12 to indicate when the battery 36 is being charged. The charging member 38 includes a contact 46 that is configured to be placed in electrical communication with a power source 44. For instance, the charging member 38 may include a female plug that is engageable with a power cord such as would be used for powering cellular phones and other small devices. However, the charging member 38 may instead include a contact 46 which comprised an induction recharger as shown in FIG. 4 or a connection which requires only contact without a plug insertion wherein the contact 46 may be positioned in the handle 32 or on the bottom wall 16 of the housing 14. As can be seen in the Figures, an induction charger may work well if the contact 46 is in or on the bottom wall 16 whereas either contacts requiring physical connection or induction type connections may be utilized if the contact 46 is positioned in the handle 32. A contact mating member 48, as an element of the power source 44, may be provided which includes a hook 50 for engaging the handle 32. In this way, a contact 46 in the handle 32 may provide electricity to the battery 36 when hung on the contact mating member 48 which is plugged into an electrical power source 52, such as an electrical power outlet. The battery 36 will then be charged while the housing 14 is being stored. The charging member 38 alternatively comprises, or may further comprise, a photovoltaic cell 54 that is electrically coupled to the battery 36. The photovoltaic cell 54 is mounted on an outer surface of the flap 28.

A cellular phone charger 56 is mounted within the housing 14 and is electrically coupled to the battery 36. The cellular phone charger 56 includes a compartment 58 configured for receiving a cellular phone. A cellular phone power contact 60 is mounted in the compartment 58 and is electrically coupled to the battery 36. The cellular phone power contact 60 may be provided in a structure which is compatible with the cellular phone of the user of the assembly 10. Additionally, the cellular phone power contact 60 may be provided as either a male plug or an induction charger.

In use, the assembly 10 is used in a conventional manner as a purse, backpack, briefcase and the like would be used. The light emitter 35 is powered by the battery 36 and illuminates the interior 24 of the housing 14 to allow a person to easily sort through items within the housing 14. The user of the assembly 10 may also use the assembly 10 for charging their cellular phone while it placed within the housing 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An illuminated satchel assembly comprising:
   a personal item carrier including:
      a housing having a bottom wall and a perimeter wall being attached to and extending upwardly therefrom, said perimeter wall having an upper edge defining an opening extending into an interior of said housing; and
      a handle being attached to said housing;
   a light emitter being mounted within said interior such that said light emitter is positioned to selectively illuminate said interior;
      a battery being mounted in said housing and being electrically coupled to said light emitter;
   a charging member being mounted to said personal item carrier and being electrically coupled to said battery;
   a cellular phone charger being mounted within said housing and being electrically coupled to said battery;
   wherein said charging member includes a contact being configured to be placed in electrical communication with a power source, said contact being positioned in said handle; and
   a contact mating member, said contact mating member being extrinsic to said personal item carrier and positioned on an upwardly facing surface of a hook wherein said contact is alignable to engage said contact mating member when said handle is positioned on said hook.

2. The illuminated satchel assembly according to claim 1, wherein said housing is comprised of a flexible material.

3. The illuminated satchel assembly according to claim 1, further including a closure being attached to said housing and being positioned in a closed position closing said opening or in an open position allowing access to said interior through said opening.

4. The illuminated satchel assembly according to claim 3, wherein said closure comprises a flap being attached to said perimeter wall and being removably extendable over said opening.

5. The illuminated satchel assembly according to claim 4, wherein said charging member includes a photovoltaic cell being electrically coupled to said battery.

6. The illuminated satchel assembly according to claim 5, wherein said photovoltaic cell is mounted on an outer surface of said flap.

7. The illuminated satchel assembly according to claim 3, wherein said handle comprises an elongated strap having a pair of ends attached to said housing, said strap having a length greater than 12.0 inches.

8. The illuminated satchel assembly according to claim 1, wherein said charging member includes a photovoltaic cell being electrically coupled to said battery.

9. The illuminated satchel assembly according to claim 1, wherein said cellular phone charger includes:
   a compartment configured for receiving a cellular phone; and
   a cellular phone power contact being mounted in said compartment and being electrically coupled to said battery.

10. An illuminated satchel assembly comprising:
    a personal item carrier including:
       a housing having a bottom wall and a perimeter wall being attached to and extending upwardly therefrom, said perimeter wall having an upper edge defining an opening extending into an interior of said housing, said housing being comprised of a flexible material;
       a closure being attached to said housing and being positioned in a closed position closing said opening or in an open position allowing access to said interior through said opening, said closure comprising a flap being attached to said perimeter wall and being removably extendable over said opening;
       a handle being attached to said housing, said handle comprising an elongated strap having a pair of ends attached to said housing, said strap having a length greater than 12.0 inches;
    a light emitter being mounted within said interior such that said light emitter is positioned to selectively illuminate said interior;
    a battery being mounted in said housing and being electrically coupled to said light emitter;
    a charging member being mounted to said personal item carrier and being electrically coupled to said battery, said charging member including:
       a contact being configured to be placed in electrical communication with a power source, said contact being positioned in said handle;
       a photovoltaic cell being electrically coupled to said battery, said photovoltaic cell being mounted on an outer surface of said flap;
    a contact mating member, said contact mating member being extrinsic to said personal item carrier and positioned on an upwardly facing surface of a hook wherein said contact is alignable to engage said contact mating member when said handle is positioned on said hook;

a cellular phone charger being mounted within said housing and being electrically coupled to said battery, said cellular phone charger including:
   a compartment configured for receiving a cellular phone; and
   a cellular phone power contact being mounted in said compartment and being electrically coupled to said battery.

\* \* \* \* \*